United States Patent Office 3,357,229
Patented Dec. 12, 1967

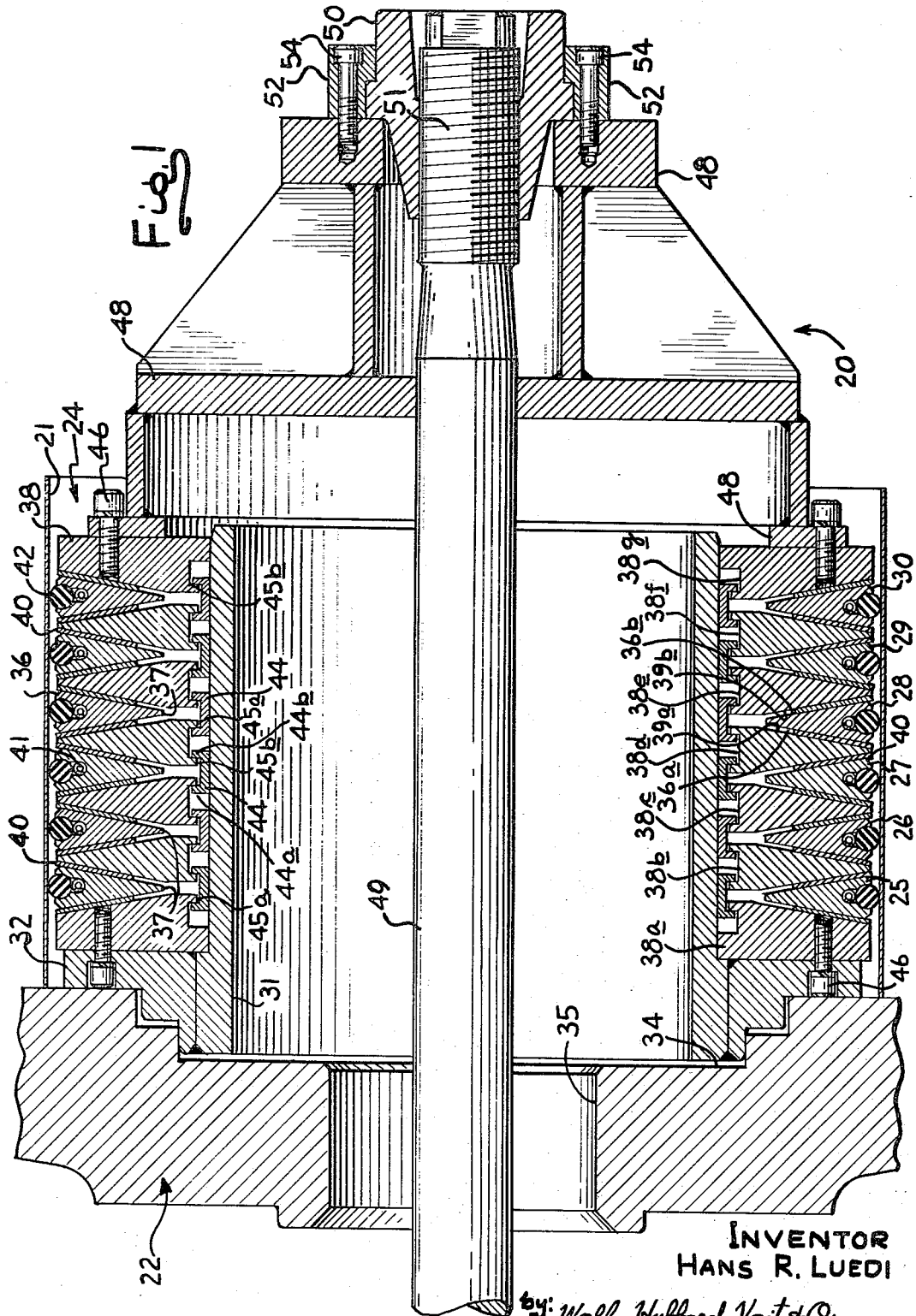

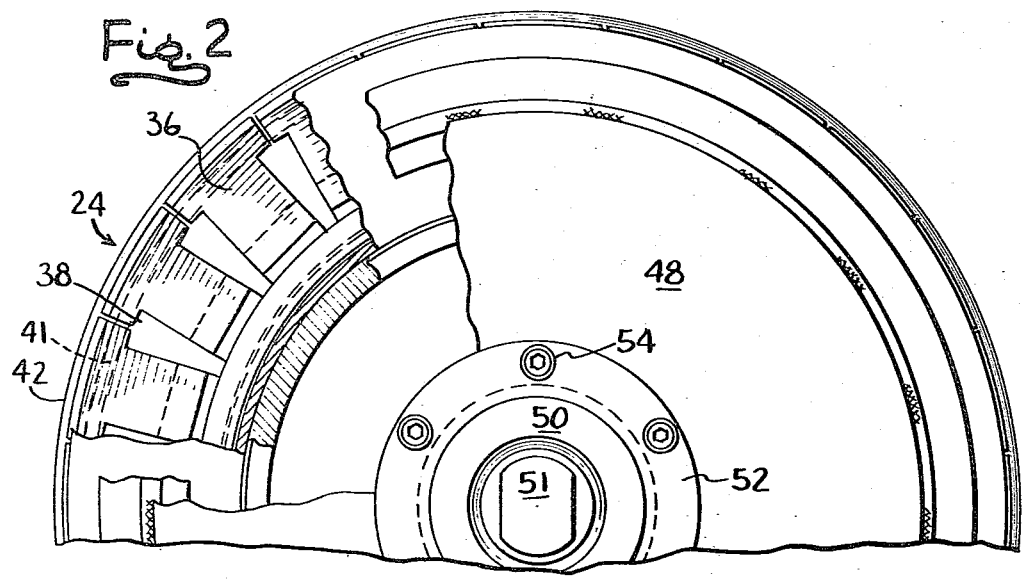
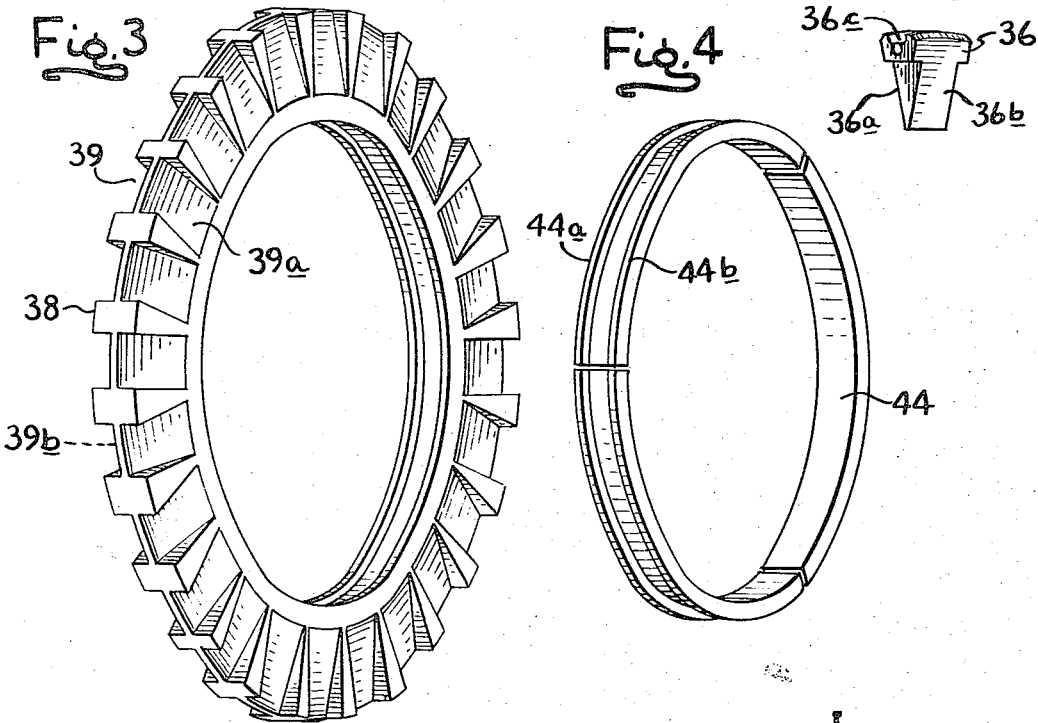

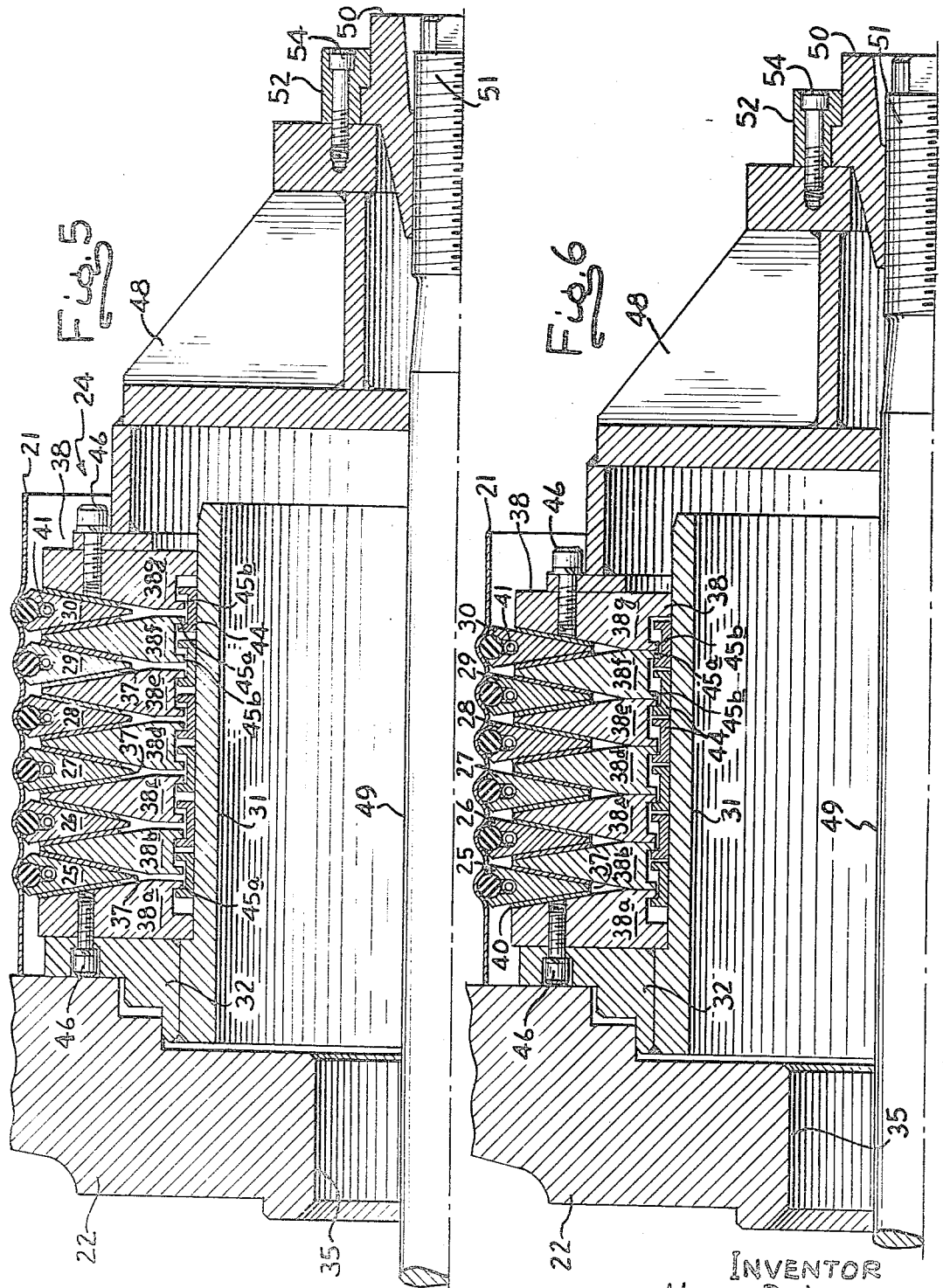

3,357,229
APPARATUS FOR FORMING A BEADED SHELL
Hans R. Luedi, Highland Park, Ill., assignor to Grotnes Machine Works, Inc., Chicago, Ill., a corporation of Illinois
Filed Feb. 9, 1965, Ser. No. 431,388
6 Claims. (Cl. 72—393)

ABSTRACT OF THE DISCLOSURE

Apparatus for expanding a plurality of radially extending peripheral beads in a cylindrical sheet metal blank wherein the material is stressed primarily in a radial and circumferential direction with the strain in the longitudinal or axial direction being controlled with minimum values.

Bead forming apparatus having a plurality of radially expansible die units which are axially shiftable relative to the axis of the apparatus with the die units being expanded radially and contracted axially with such radial expansion and axial contraction being positively controlled to form peripherally beaded products having only a minimum average net axial strain.

An apparatus for forming a beaded shell having a plurality of axially shiftable and radially extensible die units wherein selectable ones of the die units may be restrained from expanding to vary side wall configurations formed therewith.

---

The present invention relates generally to metal forming apparatus and, more particularly, to apparatus for forming a plurality of axially spaced peripheral beads in a hollow, substantially cylindrical, sheet metal blank. In its principal aspect, the invention is concerned with improved apparatus for locally expanding a hollow sheet metal blank so as to form therein a plurality of axially spaced peripheral beads alternating with a plurality of axially spaced peripheral furrows, yet wherein the net axial strain created in the blank during the beading or metal deforming operation is minimized, thereby producing a finished beaded product characterized by its ability to withstand a maximum amount of deformation without fracture.

A peripherally beaded product of the type that may be advantageously formed by the methods and apparatus of the present invention is described and claimed in the copending application of M. J. M. Coppens, Ser. No. 273,071, filed July 5, 1963, now abandoned, and copending divisional application thereof of M. J. M. Coppens Ser. No. 470,983, filed July 12, 1965, now U.S. Patent 3,268,-109, all assigned to the assignee of the present invention. Thus, there is disclosed and claimed in the aforesaid Coppens applications a peripherally beaded sidewall for use with sheet metal shipping containers. Such applications further disclose and claim a method for forming a beaded container sidewall wherein the hollow blank is locally expanded in the regions where the beads are to be formed, while at the same time the blank material on either side of each bead being formed is permitted to move toward the beads with the relationship between radial expansion and axial contraction of the blank being controlled so as to minimize the average net axial strain created in the blank. Since the average net axial strain is minimized, the blank material can be deformed to a greater extent without risk of fracturing or otherwise damaging the material. Moreover, the finished product can withstand greater deformation forces of the type normally encountered during shipping or handling than could a similar beaded product which is made without controlling the average net axial strain.

Numerous different approaches have heretofore been utilized for forming peripherally beaded products. For example, one common approach has involved the use of internal expanders employing expandable die segments which are utilized for forming beads in a cylindrical shell. However, with such expanders the die segments are constrained to move directly outward along radial lines. Consequently, such expanders are incapable of simultaneously forming a plurality of beads in a shell in such a manner as to minimize the average net axial strain created therein.

Another early approach to the problem of forming beaded sidewall configurations is that disclosed in U.S. Patent No. 3,099,311, issued July 30, 1963, to O. J. Van Leer et al. Thus, in the aforesaid Van Leer et al. patent there is disclosed and claimed an apparatus employing a plurality of axially floatable external die segments together with an internally disposed, hydraulically expansible rubber bag. The arrangement is such that the cylindrical blank is interposed between the external die segments and the internally disposed rubber bag. The latter is then pressurized so as to locally expand the blank to form beads complementary to die cavities formed in the external die segments. The die segments are, in turn, collapsed axially to foreshorten the blank as the latter is expanded. While the apparatus disclosed and claimed in the Van Leer et al. patent does constitute a substantial improvement over the types of forming equipment which are incapable of permitting simultaneous axial contraction and radial expansion of a workpiece, nevertheless, certain disadvantages have been encountered, particularly when forming beaded sidewalls for relatively large shipping drums such, for example, as a fifty-five gallon drum or the like. Merely by way of example, difficulties have been encountered in loading an unformed blank into beading equipment of the type employing external dies and an internal hydraulically actuated expanding medium. Moreover, a rupture of the expansible bag can result in significant amounts of lost operating time. As a consequence, apparatus of the type disclosed and claimed in the aforesaid Van Leer et al. patent has not provided a completely satisfactory solution to the problems faced by manufacturers of peripherally beaded products such as container sidewalls.

Accordingly, it is a general aim of the present invention to provide an improved apparatus which overcomes all of the foregoing disadvantages and which is characterized by its ability to form peripherally beaded products having only a minimum average net axial strain. While not so limited in its application, the invention will find especially advantageous use in the formation of a peripherally beaded cylindrical sidewall for use with sheet metal drums or similar sheet metal containers.

A related object of the invention is the provision of an improved apparatus for forming peripherally beaded products characterized by its ability to simultaneously control the relationship between radial expansion and axial contraction of the blank being formed, yet wherein this result is achieved without requiring the use of either externally disposed die segments or internally disposed complex deformable hydraulic expansion systems.

It is a more specific object of the invention to provide an improved beading apparatus for forming a plurality of peripherally disposed beads in a cylindrical blank and which is compact in size.

An ancillary object of the invention is to provide an improved beading apparatus for cylindrical metal blanks which permits of ease and rapidity in loading such blanks onto the expanding equipment prior to a beading operation, as well as ease and rapidity of removal of such blanks from the equipment following a beading operation. In this connection, it is an object to provide a simple, reliable beading apparatus which is particularly suitable for use in mass production manufacturing operations.

Another object of the invention is the provision of an improved apparatus for forming peripheral beads in a cylindrical blank wherein the blank is locally expanded in a radial direction while also being subjected to axial contraction, and wherein such radial expansion and axial contraction are positively controlled, thus permitting the manufacture of products having desired internal strain characteristics and desired shell configurations.

In another of its important aspects, it is an object of the invention to provide an improved apparatus for making beaded drum walls which is extremely versatile and which not only permits the formation of beads of varying shapes or contours but which also permits variation in the sidewall configuration to be formed by simple machine adjustments. In this connection, it is a more specific object to provide a bead forming apparatus in which selectable ones of the die units may be restrained from expanding, thereby allowing formation of a different sidewall configuration and wherein this can be accomplished in a relatively few minutes time.

Other objects and advantages of the invention will become apparent as the following description proceeds, taken in conjunction with the accompanying drawings, in which:

FIGURE 1 is a general side view, in vertical section, of an exemplary bead expanding apparatus embodying the features of the present invention, such apparatus here shown with the die segments retracted and a cylindrical blank positioned thereon in readiness for a beading operation in accordance with the invention;

FIG. 2 is a fragmentary, front end view, partially in section, of the apparatus shown in FIG. 1;

FIG. 3 is a perspective view depicting in greater detail one of the die supporting plates utilized with the exemplary apparatus shown in FIG. 1;

FIG. 4 is a perspective view here illustrating one of the flanged collars which are utilized to support and control the spacing of the plates shown in FIGS. 1 and 3;

FIGS. 5 and 6 are vertical half sections of the exemplary apparatus shown in FIG. 1, respectively, depicting the apparatus with the die segments partially expanded during an intermediate point in an expanding operation, and fully expanded at the completion of a beading operation;

Figure 7:
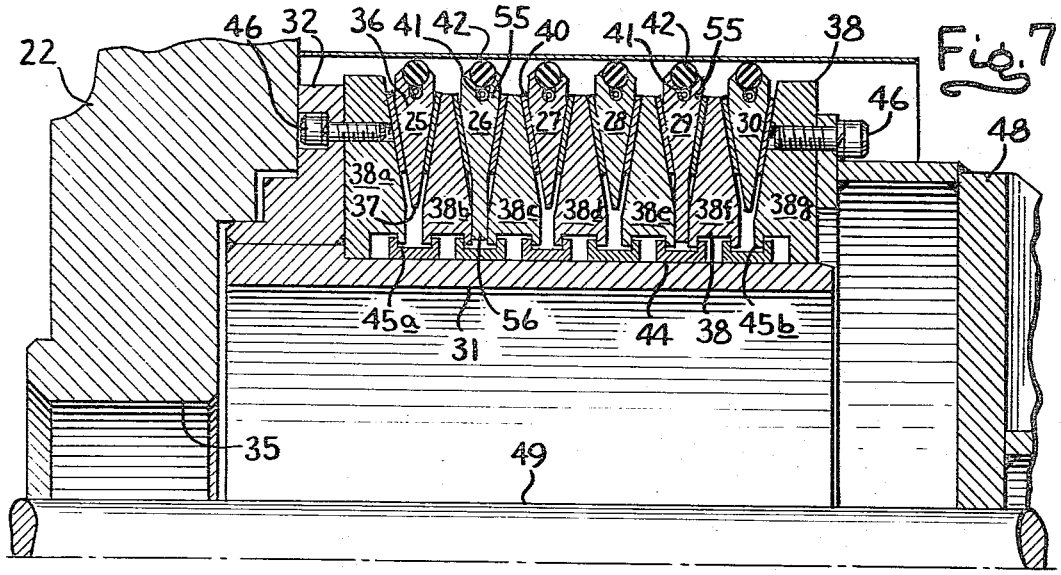
Figure 8:
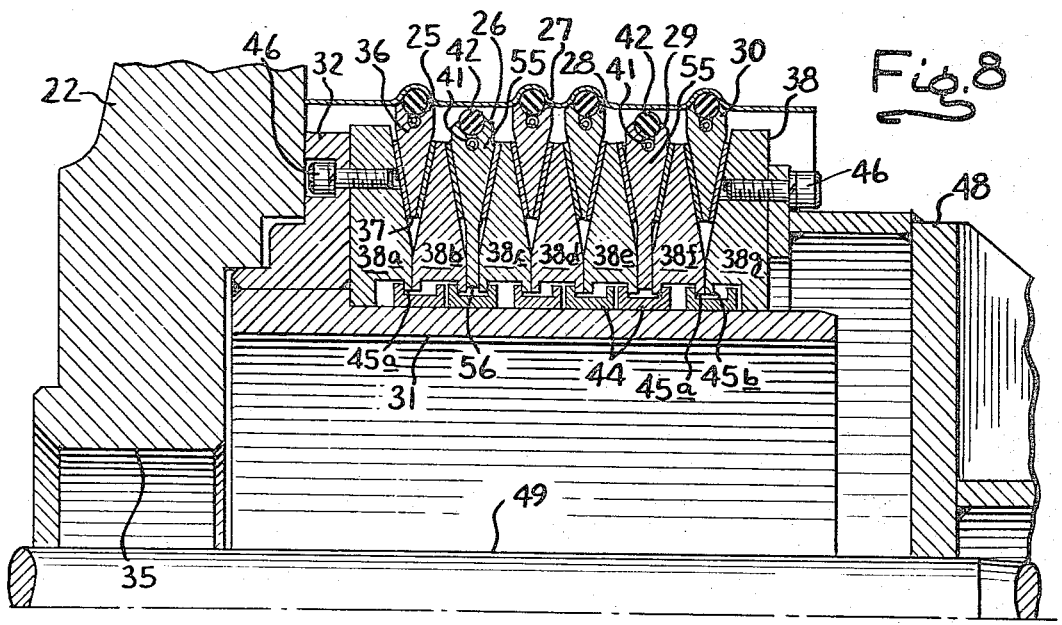

FIG. 7 is a vertical half section of the exemplary bead forming apparatus shown in FIG. 1, but here depicting the apparatus prior to initiation of a beading operation with two modified die segments, respectively positioned in two different annular die units, such modified die segments here serving to prevent expansion of their associated die units and consequent formation of a beaded product having axially extensive unbeaded portions;

FIG. 8 is a view similar to FIG. 7, but here showing the apparatus at the completion of an expanding cycle; and FIG. 9 is a perspective view of one of the die segments shown in FIG. 1.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

Referring now to the drawings, and particularly to FIGS. 1 and 2, there is illustrated an exemplary expanding apparatus, generally indicated at 20, which is particularly suited for forming alternating beads and furrows in a cylindrical metal blank 21 in accordance with the present invention. As best shown in FIG. 1, the illustrative apparatus 20 includes a frame 22 upon which is mounted an annular expanding die assembly, generally indicated at 24. As here shown, the die assembly comprises a plurality of segmented, radially expansible, annular die units 25–30 which are concentrically mounted about a tubular support sleeve 31 with freedom for axial movement relative thereto. In order to securely mount the die assembly 24 on the frame 22, the support sleeve 31 is welded, or otherwise fixedly secured, to a stepped support ring 32, the latter being positioned within a similarly stepped recess 34 formed in the frame 22 coaxial with an aperture 35 formed therein.

While the exemplary expanding apparatus 20 has here been shown as including six radially expansible die units 25–30, it will be understood, as the ensuing description proceeds, that the particular number of die units employed is not critical to the present invention. Thus, the apparatus 20 can include either a greater or lesser number of die units dependent upon the number of beads and furrows that are to be formed in the cylindrical metal blank 21. Moreover, the particular cross-sectional shape of the die segments may vary dependent upon the final desired cross-sectional configuration of the beads and furrows to be formed in the blank.

In accordance with one of the important aspects of the present invention, provision is made for effecting simultaneous controlled radial expansion and axial contraction of the die units 25–30, thereby expanding the blank 21 in a radial direction to form beads therein, while at the same time collapsing the die units axially so as to move the blank material toward the beads being formed, so as to minimize the axial strain created in the finished beaded shell. To this end, and as best shown by reference to FIGS. 1 and 2 conjointly, each of the die units 25–30 includes a plurality of generally T-shaped die segments 36 which are here held in annular arrays by means of a plurality of annular carrier plates 38 spaced axially along and surrounding the tubular support sleeve 31.

In carrying out this aspect of the present invention, each of the die segments 36 (FIG. 9) includes a radially disposed leg portion having its opposed axial faces tapered as shown at 36a, 36b, with the tapered surfaces 36a, 36b converging toward the inner radial extremity of the segment. Similarly, the annular carrier plates 38, which here serve to support the segments 36 in annular arrays defining the die units 25–30, are each provided with a plurality of radial slots 39 (FIG. 3) formed in the opposed axial faces thereof, the slots having tapered axial surfaces 39a, 39b complementary to the surfaces 36a, 36b on the die segments 36. Thus, the arrangement is such that when the carrier plates 38 are properly positioned about the support sleeve 31 with the slots 39 in adjacent plates being axially aligned, the slots in each pair of adjacent plates define a plurality of wedge-shaped cavities 37 adapted to receive the radial leg portions of the die segments 36.

It will be noted upon inspection of FIG. 1 that while the five innermost carrier plates 38b–38f in the exemplary apparatus 20 are provided with slots 39 formed in each axial face thereof, the two outermost plates 38a and 38g need have slots formed on only one axial face—viz., the faces adjacent the die units 25 and 30, respectively. In order to facilitate relative radial sliding movement between the segments 36 and the plates 38, shims 40 of suitable bearing material are interposed between the adjacent tapered axial faces of the segments 36 and the slots 39 as, for example, by bonding the shims to either the tapered surfaces 39a, 39b of the slots or to the opposite tapered surfaces 36a, 36b of the segments.

In order to retain the die segments in place within the cavities 37 so as to define the annular die units 25–30, garter springs 41 are positioned within arcuate grooves 36c (FIG. 9) formed in the outer face of each segment, there being one spring 41 encircling all of the segments 36 in each die unit. Thus, the springs 41 tend to urge the die segments 36 radially inward and into firm, seated engagement with the carrier plates 38. O-rings 42 formed of a resilient material are positioned in the grooves 36c outwardly of the garter springs 41, thereby providing resilient surfaces between the die units 25–30 and the cylindrical blank 21.

For the purpose of supporting the carrier plates 38 on the tubular support sleeve 31 in axially spaced relation, yet with freedom for axial movement relative thereto, the plates 38 are carried by annular split collars 44 (FIGS. 1 and 4) each having a pair of outwardly extending radial flanges 44a, 44b, the collars here being axially slidable along the sleeve 31. In the exemplary form of the invention, the five innermost annular carrier plates 38b–38f are provided with a pair of axially spaced, inwardly extending, radial flanges 45a, 45b having a slightly smaller internal diameter than the external diameter of the collar flanges 44a, 44b. As best shown in FIG. 1, the five innermost carrier plates 38b–38f straddle adjacent pairs of the six collars 44—that is, the carrier plates bridge the spaces between adjacent collars with the flange 45a on any given plate being in side-by-side relation with the flange 44a on one collar 44, and the flange 45b on that given plate being in side-by-side relation to the flange 44b on the adjacent collar 44.

The two outermost carrier plates 38a, 38b (i.e., those on the opposite axial extremities of the die assembly 24) are each provided with only one inwardly extending radial flange which is disposed in side-by-side relation with the corresponding flange on the outermost collar. Thus, referring to FIG. 1, it will be observed that the left end plate 38a includes a radial flange 45a positioned adjacent the flange 44a on the left end collar 44. Similarly, the right end plate 38g (as viewed in FIG. 1) includes only one flange 45b disposed adjacent the flange 44b on the right end collar 44. In the exemplary apparatus, the left end plate 38 is rigidly secured to the stepped support ring 32 by means of bolts 46 or the like, while the right end plate 38 is similarly fastened by bolts 46 to a webbed force transmitting or drive plate 48. Thus, the maximum axial spacing between the plates, (i.e., the spacing when the die units are not expanded but are in the position shown in FIG. 1) is limited by the axial width of the recess between the flanges 44a, 44b, on the collars 44 and the distance between the flanges 45a, 45b on the plates 38.

In keeping with the present invention, provision is made for sliding the carrier plates axially (to the left as viewed in FIG. 1) so as to cam the die units 25–30 radially outward, while at the same time positively shifting the die units 25–30 in an axial direction. To accomplish this, an actuator bar 49 extends coaxially through the die assembly 24 and passes through the aperture 35 formed in the frame 22 of the expanding apparatus 20. The right end of the actuator bar 49 (as viewed in FIG. 1) is coupled to the drive plate 48 by means of a collar 50 which is drivingly coupled to the bar 49, for example, by screw threads 51 or the like. As here shown, the collar 50 is bolted to the webbed drive plate 48 by means of an annular clamping ring 52, and a plurality of bolts 54. Thus, the drive plate 48 may be adjustably positioned at a selected axial position relative to the actuator bar 49 by the simple expedient of threading or unthreading the collar 50 along the threaded portion 51 of the bar 49.

The left hand end of the actuator bar 49 is coupled to any suitable power source capable of effecting controlled reciprocation of the bar such, for example, as a conventional double acting hydraulic piston and cylinder (not shown) of the type well known to those skilled in the art.

Having in mind the foregoing structural details, a brief description of a typical beading operation will serve to facilitate an understanding of the present invention. To this end, reference is first made to FIG. 1 wherein the die units 25–30 are shown in their nonexpanded position in readiness for an expanding or beading operation. Initially, a cylindrical metal blank 21 is mounted about the die assembly 24. At this time, the power source (not shown) is activated to draw the actuator bar 49 toward the left (as viewed in FIG. 1). As the actuator bar 49 and drive plate 48 move to the left, axial forces are transmitted to the right hand carrier plate 38g, thus urging the latter toward the next adjacent carrier plate 38f. This serves to "squeeze" the die segments 36 in die unit 30, thus camming the die segments radially outward. At the same time, force is transmitted through the die segments in die unit 30 to the next adjacent carrier plate 38f, thus shifting the latter to the left and camming the die segments 36 in die unit 29 radially outward between plates 38e and 38f.

As the actuator bar 49 continues to move to the left during a power stroke, all of the die units 25–30 are radially expanded and, at the same time, they are shifted axially to the left by the leftward moving carrier plates. Of course, it will be understood that the die segments 36 in adjacent units may move radially outward either uniformly or in a random manner, depending upon the uniformity or lack of uniformity of the frictional forces between their sliding surfaces.

Referring now to FIG. 5, it will be observed that as the die units 25–30 are expanded radially, they engage the inner surface of the blank 21 and start to deform the latter so as to form alternate beads and furrows therein. Since the die units 25–30 are being positively collapsed toward the left during the expanding operation, the furrows between adjacent beads in the blank are axially compressed, thus forming well defined beads and furrows and producing a beaded shell (FIG. 6) having only minimum longitudinal or axial strains. This result occurs, of course, because the material in the blank between adjacent beads is not stretched but, rather is permitted to move toward the beads being formed. Moreover, the wedge-shaped construction of the die segments 36 and carrier plate slots 39 is such that the former are cammed outwardly without locking and without slippage of the blank material over the surfaces of the die units. As will be observed upon inspection of FIG. 6, the die units will continue to expand radially and collapse axially until the carrier plates 38 bottom upon one another.

It has been found that particularly advantageous results are achieved, when working with an unbeaded blank formed of 24 gauge cold rolled steel and having an initial diameter of 22½", by providing die segments 36 having an included angle of 20° between their tapered sides and carrier plates 38 having tapered slot surfaces 39a, 39b with a 10° slope, thereby producing a beaded shell with 23⅞" diameter beads, 22⅞" diameter furrows, and a pitch distance of 1 3/16". It will, however, be understood that the above dimensions are given only by way of example and may vary, dependent upon the shell material and the configuration of the shell being formed.

One of the advantageous features of the present invention is that the die units can be retracted and the beaded shell readily removed from the expanding apparatus 20 without risk of further deformation of, or damage to, the formed shell. Thus, when the actuator bar 49 starts to return to the right (as viewed in FIG. 6), the right hand carrier plate 38g shifts to the right, thereby releasing the die unit 30. The latter is then radially contracted by the garter spring 41, thereby freeing the die unit 30 from the formed bead. As the right hand carrier plate 38g continues to move to the right, its flange 45b coacts with flange 44b on the right hand collar 44 to shift the latter to the right. When the flange 44a engages the flange 45a on the next carrier plate 38f, the latter is shifted to the right, thus releasing the die unit 29. It can, therefore, readily be seen that as the motion of the actuator bar 49 continues to the right, the die units will be retracted one after another and, at the end of the actuator stroke, the shell will be free for removal from the apparatus 20 while the carrier plates 38 will be uniformly spaced with the die units radially collapsed in readiness for the ensuing beading operation.

In accordance with another of the important aspects of the present invention, provision may be made on a selectable basis for inactivating one or more of the die units 25–30 so as to prevent radial expansion thereof and thus permit manufacture of beaded products having axially extensive unbeaded portions. To accomplish this, there is provided a modified die segment 55 (FIG. 7 and 8) which is identical to the segment 36 (FIG. 9) in all respects except that the modified segment 55 includes an extension or radial tail 56 which extends downwardly between adjacent carrier plates 38 and which serves to prevent relative closing movement of such plates. Thus, it is merely necessary to remove the O-ring 42 and garter spring 41 of those die units which are to be inactivated. Two or more of the die segments 36 are then radially removed from their cavities 37 and the modified die segments 55 inserted in their place. The garter spring 41 and O-ring 42 are then replaced.

Referring to FIGS. 7 and 8, it will be noted that modified die segments 55 have been inserted into die units 26 and 29. Consequently, during the power stroke of the actuator bar 49, force is transmitted through the extensions 56, but the die units 26 and 29 do not expand. It will be appreciated from the foregoing that various sidewall configurations can be formed merely by inserting the modified die segments 55 into selected die units in accordance with the desired wall configuration.

In the following claims, the term "annular" is intended to include any configuration which is generally ring-like including but not limited to circular, elliptical, and round cornered polygonal. The apparatus in accordance with the present invention produces a drum body or sidewall formed with a plurality of radially outwardly extending peripheral beads over a substantial portion of the length of the sidewall so as to form a container sidewall construction which exhibits optimum performance characteristics in terms of "balanced strength" and resistance to deformation forces. In the exemplary form of the apparatus shown in FIGS. 5 and 6, six such beads are formed in the sidewall, the beads being respectively spaced apart by five furrows.

Of course, while six beads and five furrows have been shown, it will be understood that the particular number of beads and furrows may be varied without departing from the invention. It is important, however, that the beads and furrows be interrelated and associated with one another in accordance with particular criteria which are set forth in the aforementioned copending Coppens applications. The apparatus in accordance with the present invention enables the production of such peripherally beaded products wherein the strains in the formed sidewall are primarily limited to circumferential strains, while axial strains are substantially minimized and the beaded product is characterized by its high resistance to loads, shocks and similar forces which tend to deform or otherwise damage containers during transportation or storage. Therefore, in the appended claims it is intended that the term "plurality" can note at least the formation of three beads.

I claim as my invention:

1. An expanding apparatus for forming at least three beads in a hollow shell wherein the average net axial strain produced in the shell during bead formation is minimized, comprising, in combination, frame means adapted to slidably receive said shell, a plurality of axially spaced annular carrier plates carried by said frame means with freedom for axial movement relative thereto, each of said plates having tapered surfaces in an axial face thereof, facing corresponding tapered surfaces on adjacent plates, said tapered surfaces defining wedge-shaped recesses between adjacent pairs of said plates, die units disposed between and carried by said plates, said die units each comprising a plurality of arcuate die segments having tapered sides complementary to the tapered surfaces on adjacent plates, and means for compressing said plates axially together so that said die segments are cammed radially outward on said tapered surfaces to deform beads in said shell, and so that said die segments move axially towards adjacent sets of die segments so as to control axial strain in said shell during formation of said beads.

2. An expanding apparatus as set forth in claim 1 further characterized in that said tapered surfaces have a slope of approximately 10° and said tapered sides have an included angle of approximately 20°.

3. An expanding apparatus for forming at least three beads in a hollow shell wherein the average net axial strain produced in the shell during bead formation is minimized, comprising, in combination, frame means adapted to slidably receive said shell, a plurality of axially spaced annular carrier plates carried by said frame means with freedom for axial movement relative thereto, each of said plates having tapered surfaces formed on axial faces thereof, said tapered surfaces defining wedge-shaped recesses between adjacent pairs of said plates, die units disposed between and carried by said plates, said die units each comprising a plurality of arcuate die segments having tapered sides complementary to the tapered surfaces on adjacent plates, said segments being seated in said wedge-shaped recesses, means including garter springs encircling said die units for urging said segments radially inward towards the axis of said frame means, axially reciprocable actuator means for compressing said plates to radially expand and axially collapse said die units between said plates, means for effecting controlled reciprocation of said actuator means, and means responsive to the retraction of said actuator means for separating said plates so that said garter springs urge said die segments radially inward to a position free of the deformed shell.

4. An expanding apparatus for forming at least three beads in a hollow shell wherein the average net axial strain produced in the shell during bead formation is minimized comprising, in combination, frame means adapted to slidably receive said shell, a plurality of axially spaced annular carrier plates carried by said frame means with freedom for axial movement relative thereto, each of said plates having tapered surfaces formed in an axial face thereof and facing corresponding tapered surfaces on adjacent plates, said tapered surfaces defining wedge-shaped recesses between adjacent pairs of said plates, die segments disposed between and carried by said plates, said die segments having tapered sides complementary to said tapered surfaces for seating in said wedge-shaped recesses, means for compressing said plates axially together so as to cam said die segments radially outward with axial movement of the die segments towards one another so that the shell collapses axially between the die segments, and means for precluding radial expansion of at least one of said die units for altering the configuration of said shell.

5. An expanding apparatus as set forth in claim 4, further characterized in that said die unit expansion precluding means includes a die segment having a substantially flat-sided projection extending between adjacent plates for precluding relative axial closing movement of said plates.

6. An expanding apparatus for forming at least three beads in a hollow shell wherein the average net axial strain produced in the shell during bead formation is minimized, comprising, in combination, frame means adapted to slidably receive said shell, a cylindrical support sleeve carried by said frame means, a plurality of flanged collars slidably carried on said sleeve, a plurality of cylindrical plates having flanged bores for seating on said collars with each plate straddling a pair of said collars, said plates having tapered surfaces thereon defining wedge-shaped recesses between adjacent pairs of said plates, segmented die units having tapered sides complementary to said tapered surfaces for seating in said wedge-shaped recesses, and actuator means for compressing said plates axially along said sleeve to forcibly expand said segmented die units radially and compress said die units axially thereby deforming said shell, said actuator means adapted to draw said plates and said collars successively along said sleeve subsequent to an expanding operation for retracting the segmented die units to free the deformed shell for removal thereof.

References Cited

UNITED STATES PATENTS

| 1,549,868 | 8/1925 | Grotnes | 72—393 |
| 1,645,971 | 10/1927 | Riegel | 72—393 |
| 1,825,030 | 9/1931 | Vaughn | 72—393 |
| 1,825,081 | 9/1931 | McKay | 72—393 |
| 1,939,065 | 12/1933 | Kruse | 72—370 |
| 2,089,476 | 8/1937 | Grotnes | 72—393 |
| 2,435,306 | 2/1948 | Grotnes | 72—393 |

FOREIGN PATENTS 444,331  3/1936  Great Britain.

CHARLES W. LANHAM, *Primary Examiner.*

E. M. COMBS, *Assistant Examiner.*